United States Patent [19]

Lin

[11] Patent Number: 5,416,465

[45] Date of Patent: May 16, 1995

[54] STEERING WHEEL CONTROLLED CAR LIGHT PILOTING SYSTEM

[76] Inventor: Chion-Dong Lin, P.O. Box No. 96-173, Taipei, Taiwan, Prov. of China

[21] Appl. No.: 71,488

[22] Filed: Jun. 4, 1993

[51] Int. Cl.⁶ ............................................. B60Q 1/34
[52] U.S. Cl. ................................... 340/465; 362/37; 362/38
[58] Field of Search ...................... 340/465; 362/37, 38

[56] References Cited

U.S. PATENT DOCUMENTS 3,415,983 12/1968 McGee .................. 362/38
3,947,680 3/1976 Cadiou ................... 362/38
4,943,893 7/1990 Shibata et al. ......... 362/37

Primary Examiner—John K. Peng
Assistant Examiner—Benjamin C. Lee
Attorney, Agent, or Firm—Bacon & Thomas

[57] ABSTRACT

A steering wheel controlled car light piloting system including a motor drive controlled by a control circuit linked to the steering column of the steering wheel of a motor car to turn the lights of the motor car through a transmission mechanism consisted of hydraulic cylinders, so as to coincide the positions of the lights of the motor car with the steering direction.

2 Claims, 16 Drawing Sheets

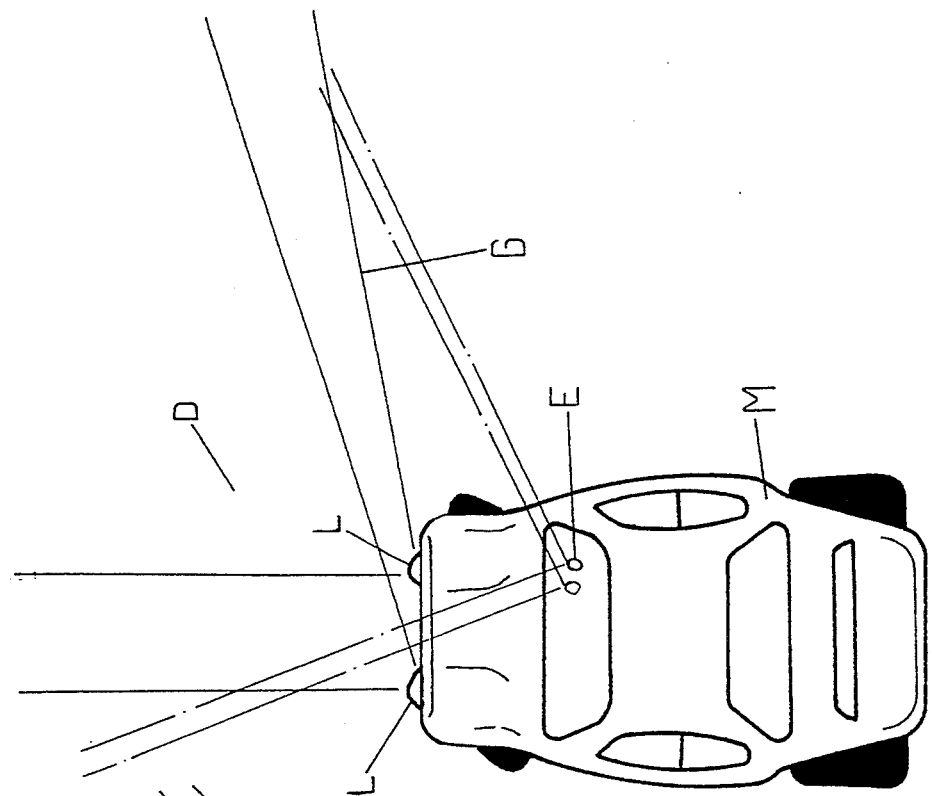
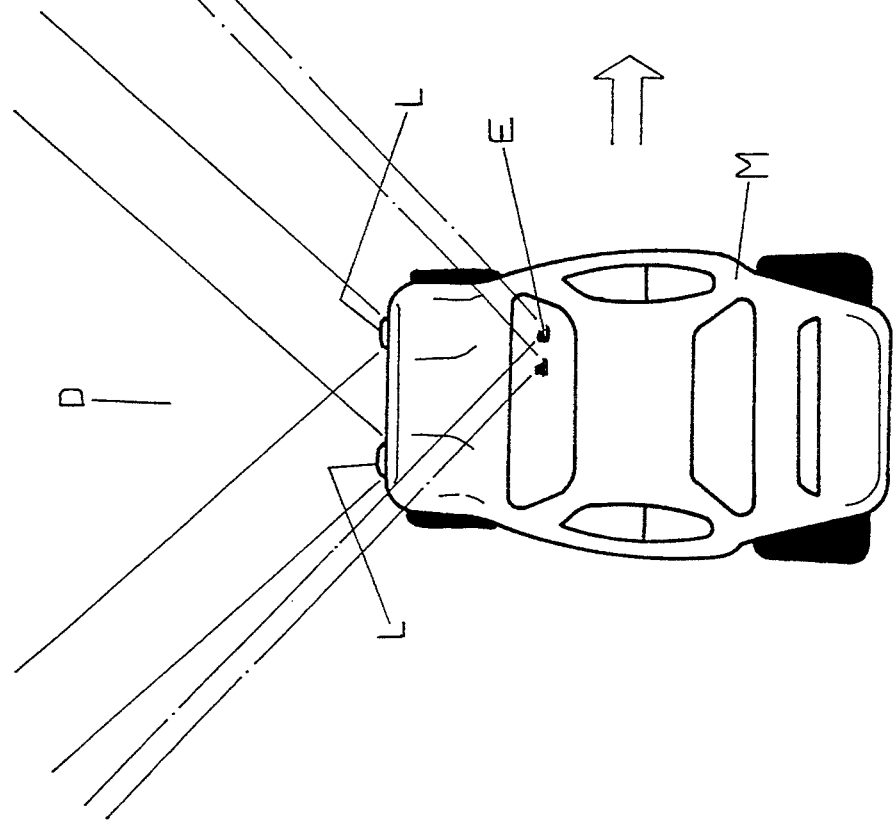
FIG 15

STEERING WHEEL CONTROLLED CAR LIGHT PILOTING SYSTEM

BACKGROUND OF THE INVENTION

The present invention relates to a car light piloting system, and more specifically to a steering wheel controlled car light piloting system which automatically pilots car lights to coincide with the steering direction of the car.

The lights of a motor car are commonly fixed in position. As shown in FIG. 1, the projection of light D of the lights L of the motor car M is constantly maintained in line with the body of the motor car M. When the steering wheel of the motor car M is turned in either direction, the body of the motor car M is not synchronously turned in the same direction, i.e. the body of the motor car M is moved to follow the steering direction at a time delay. Because the drivers will direct the eyes toward their desired direction before the motor car M is turned to coincide, a blind angle G exists out of the projection of light of the lights L of the motor car M within the driver's view angle. Therefore, a traffic accident may happen while one is changing the steering direction of the motor car.

SUMMARY OF THE INVENTION

The present invention has been accomplished under the aforesaid circumstances. The principal object of the present invention is to provide a steering wheel controlled car light piloting system which automatically turns the lights of the motor car to coincide the projection of the lights with the steering direction of the motor car. The present invention comprises an electric contact mechanism consisted of electric brushes and metal contacts disposed around the steering column of the steering wheel of a motor car, a motor drive consisted of at least one servo motor, a control circuit connected between the motor drive and the electric contact mechanism to control the revolving direction according to the turning direction of the steering wheel, and a transmission mechanism consisted of at least one hydraulic cylinder systems and controlled by the motor drive to turn the lights of the motor car causing them to coincide with the steering direction of the motor car.

BRIEF DESCRIPTION OF THE DRAWINGS

FIG. 15 is a schematic drawing showing the projection of light of the car lights piloted according to the present invention.

DETAILED DESCRIPTION OF THE PREFERRED EMBODIMENTS

Figure 1:
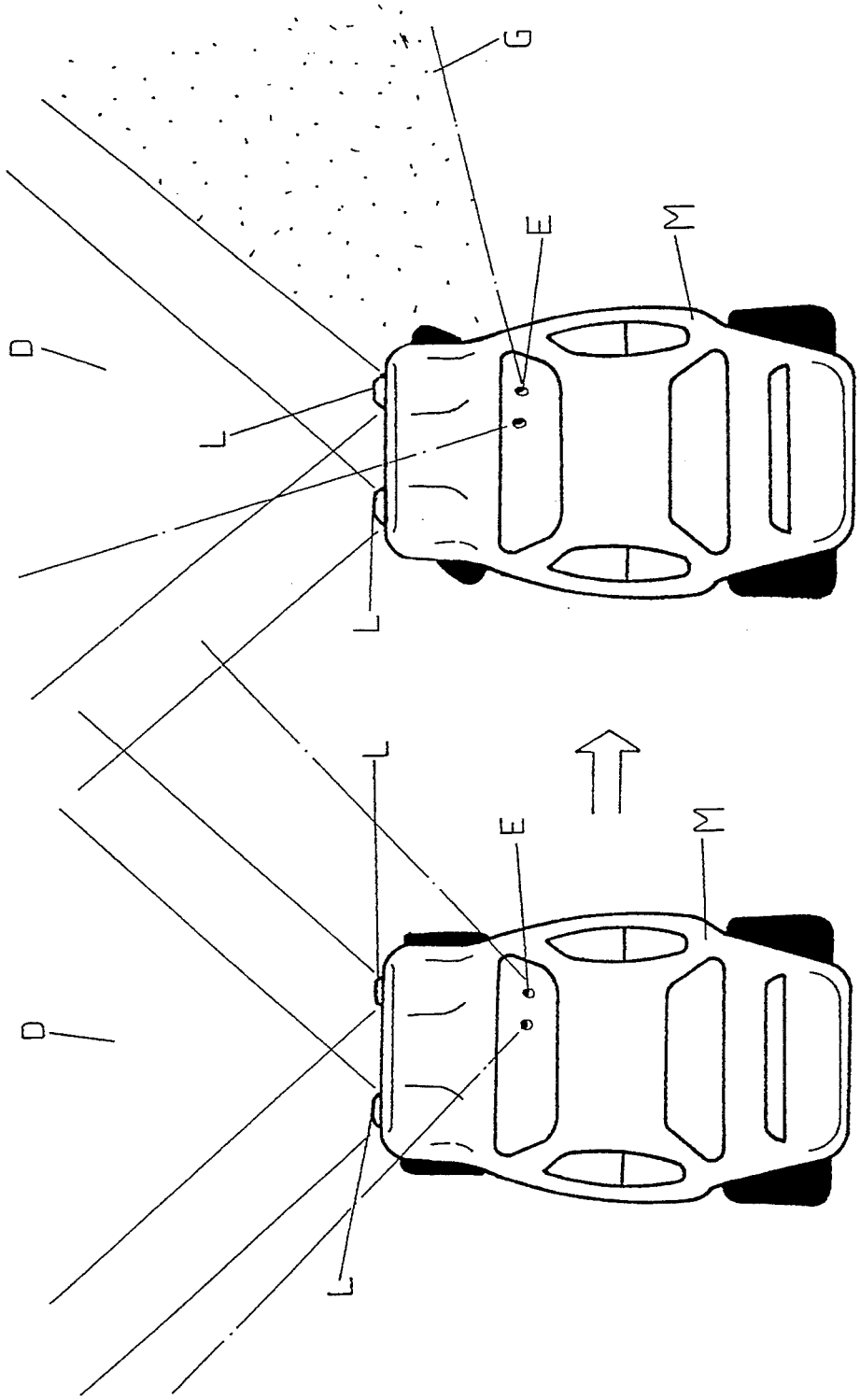
FIG. 1 is a schematic drawing showing the projection of the lights of a car according to the prior art.
Figure 2:
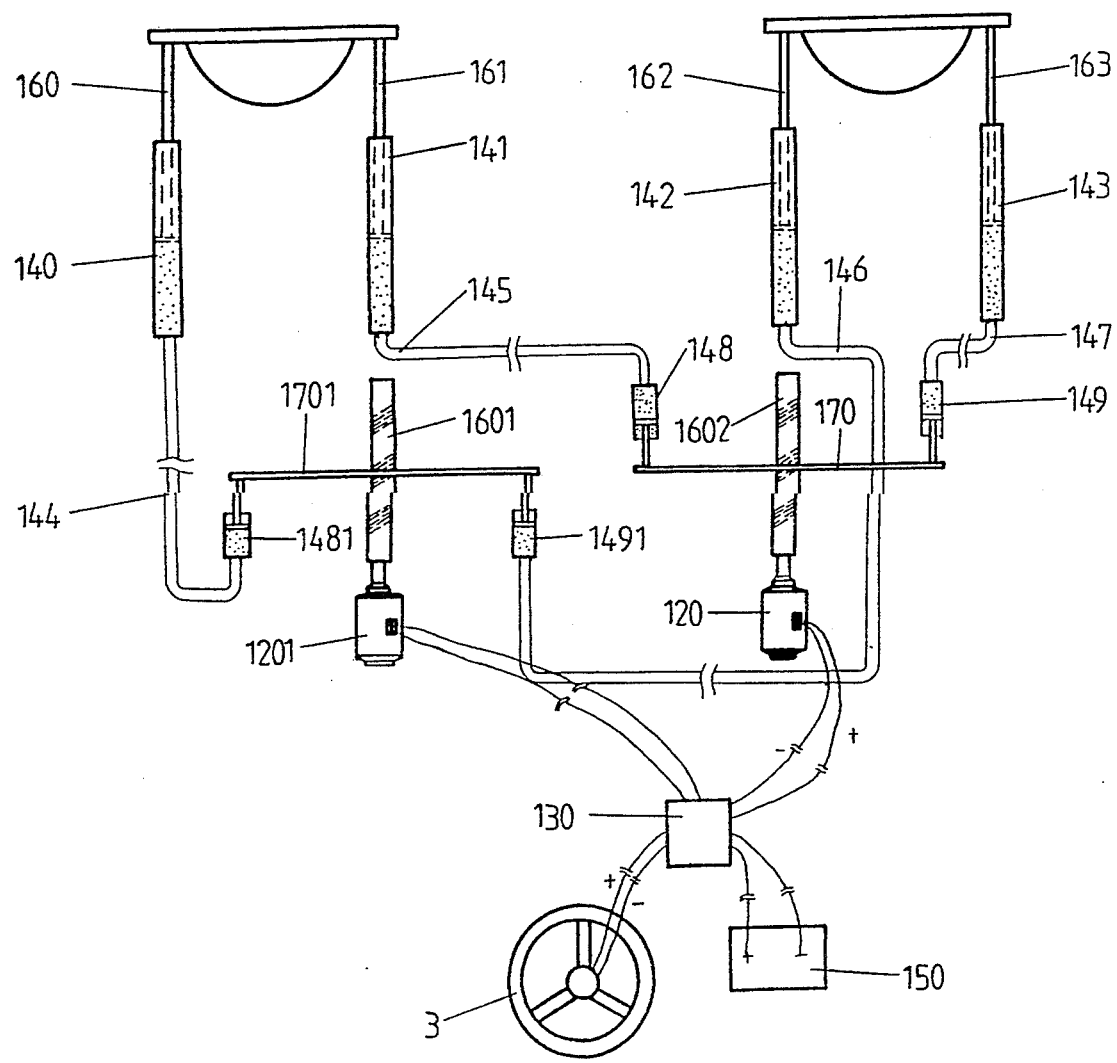
FIG. 2 illustrates the arrangement of a steering wheel controlled car light piloting system according to a first embodiment of the present invention.

Referring to FIG. 2, a control circuit 130 is connected to the steering wheel 3 and battery power supply unit 150 of a motor vehicle to control the revolving speed, steering direction and number of revolution of two servo motors, namely, the first servo motor 120 and the second servo motor 1201. A first screw rod 1602 is coupled to the output terminal of the first servo motor 120 and mounted with a first control board 170. A second screw rod 1601 is coupled to the output terminal of the first servo motor 1201 and mounted with a second control board 1701. Two hydraulic cylinders 148;149 are mounted on the first control board 170 at two opposite locations. Two hydraulic cylinders 1481;1491 are mounted on the second control board 1701 at two opposite locations. As the steering wheel 3 is turned in one direction, the control circuit 130 is triggered to turn on the first servo motor 120 in moving the first control board 170 upwards, and therefore hydraulic oil is moved from the hydraulic cylinders 148;149 on the first control board 170 toward hydraulic cylinders 141;143 through respective forward oil pipes 145;147 to lift respective piston rods 161;163. As the steering wheel 3 is turned in the reverse direction, the control circuit 130 is triggered to turn on the second servo motor 1201 in moving the second control board 1701 downwards, and therefore hydraulic oil is moved from the hydraulic cylinders 1481;1491 on the second control board 1701 toward hydraulic cylinders 140;142 through respective forward oil pipes 144;146 to lift respective piston rods 160;162. Therefore, turning the steering wheel 3 causes the respective pistons to move forwards or backwards in oscillating respective car lights synchronously. As the ignition switch of the car is turned off, the signal is sent to the control circuit 130 causing it to turn the servo motor 120 or 1201 in the reversed direction so as to turn the respective car light to the orthogonal projection position.

Figure 2A:
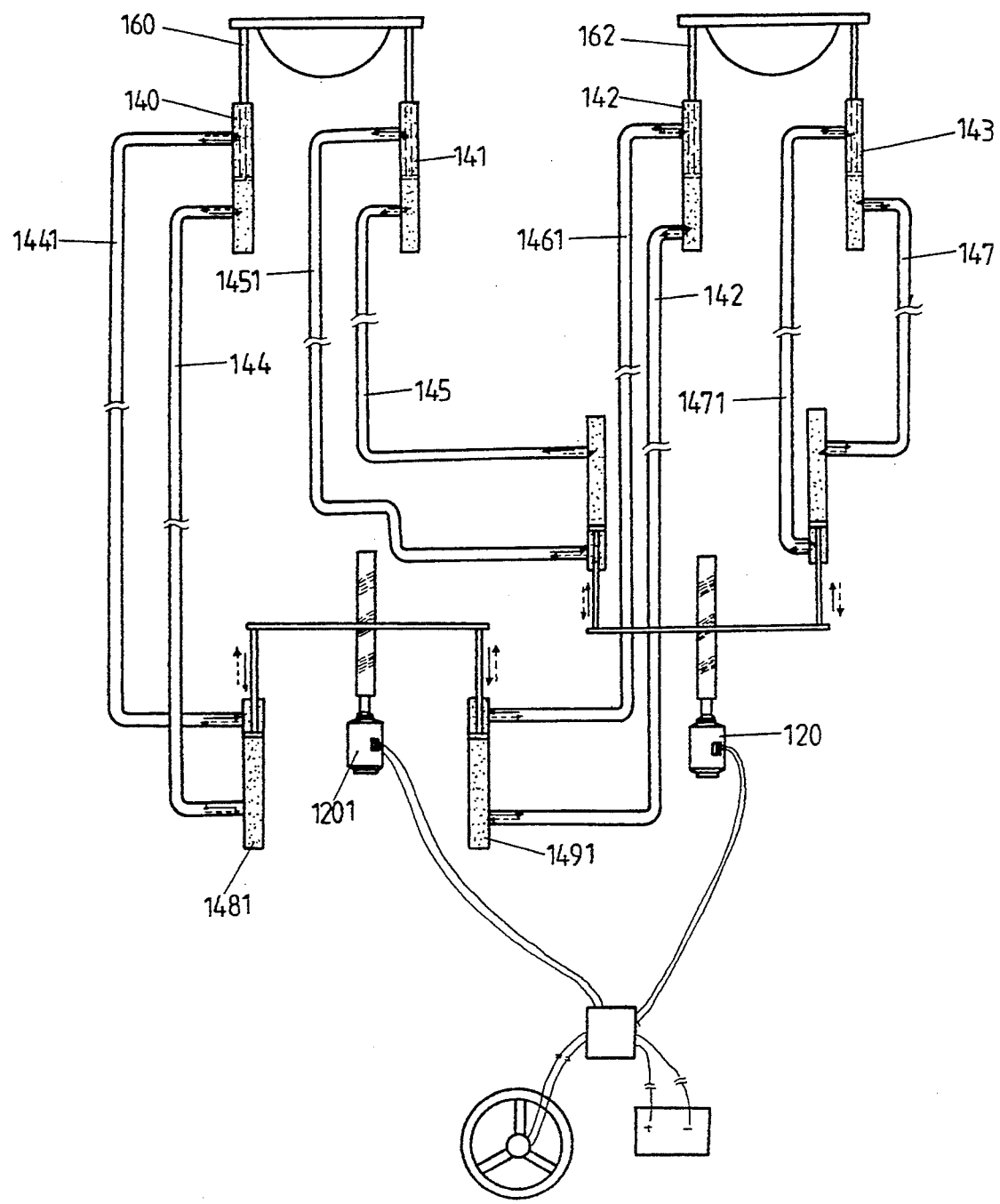
FIG. 2A shows return oil pipes connected between the hydraulic cylinders of the steering wheel controlled car light piloting system of FIG. 2.

Referring to FIG. 2A, each hydraulic cylinder has two opposite ends open for moving a respective hydraulic oil. As the piston rods 160;162 of the hydraulic cylinders 140;142 are moved outwards by the second servo motor 1201, hydraulic oil is moved out of the hydraulic cylinders 1481;1491 to the hydraulic cylinders 140;142 via the forward oil pipes 144;146, and at the same time, hydraulic oil is moved out of the hydraulic cylinders 140;142 to the hydraulic cylinders 1481;1491 through return oil pipes 1441;1461. This arrangement allows the piston rods 160;162 to be reciprocated smoothly and efficiently. Similarly, there are two return oil pipes 1451;1471 respectively connected between the hydraulic cylinders 141;143 and the hydraulic cylinders 148;149.

Figure 3:
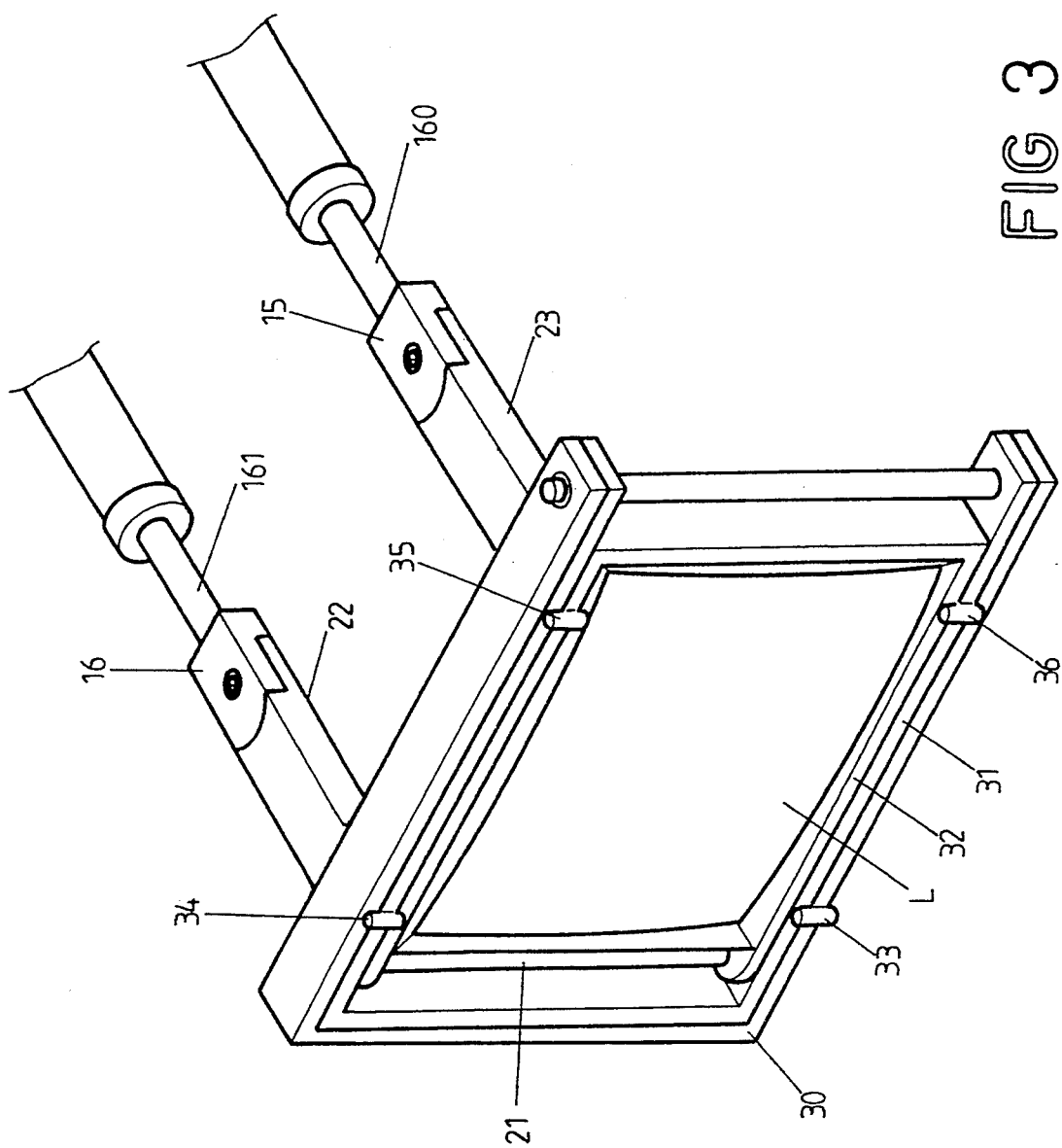
FIG. 3 is a perspective view showing the installation of the car light in the steering wheel controlled car light piloting system of FIG. 2.
Figure 4:
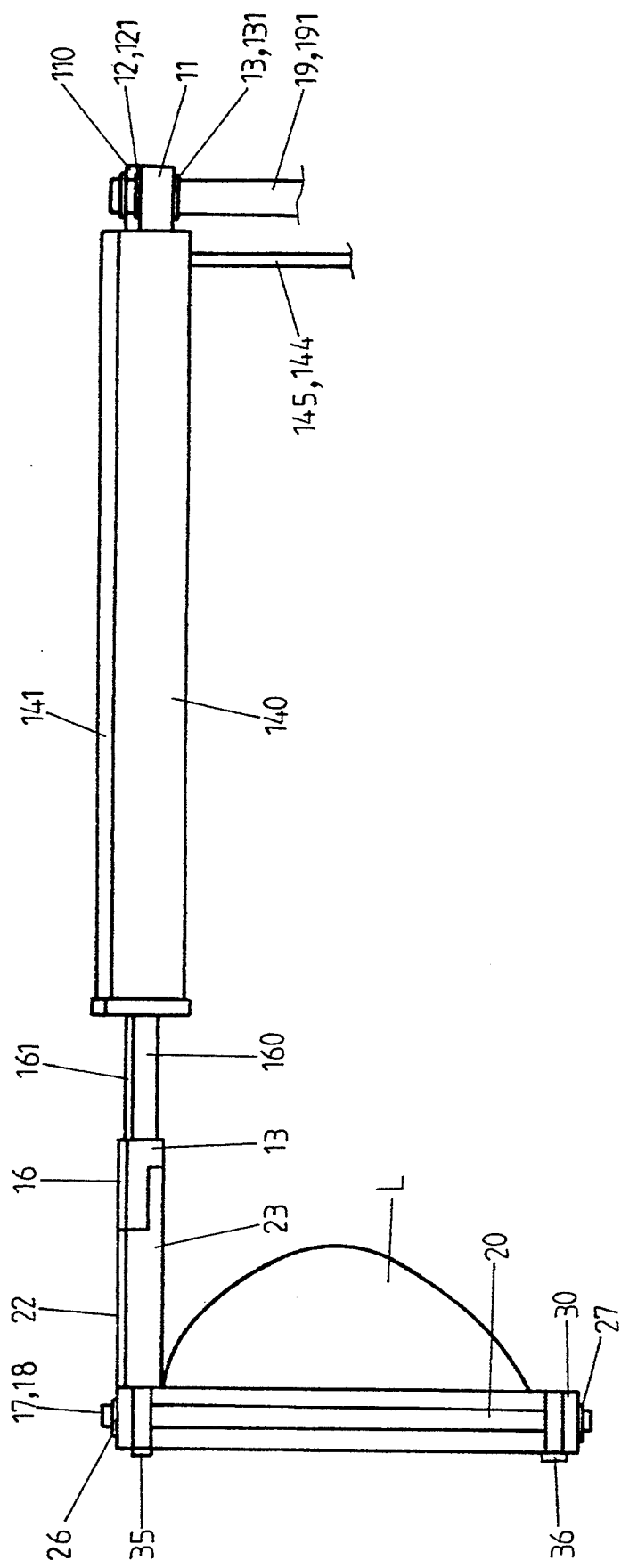
FIG. 4 is a side view of FIG. 3.

Referring to FIGS. 3 and 4, a car light L is mounted on an inner frame 32 inside an outer frame 31 within a lamp holder 30. Two parallel connecting rods, namely, the first connecting rod 23 and the second connecting rod 22 are perpendicularly and respectively connected to the frames 31;32 by pin rods 17;18. The outer frame 31 is an open end frame in a rectangular configuration, having two opposite locating rods 33;34 vertically aligned on two opposite sides thereof. The inner frame 32 is an open end frame in a rectangular configuration, having two opposite locating rods 35;36 vertically aligned on two opposite sides thereof. The two opposite ends of the outer frames 31 are respectively fastened to the two opposite ends of the lamp holder 30 on the inside by an axle 20 and two locating rings 26;27. The two opposite ends of the inner frame 32 are respectively fastened to the outer frame 31 by an axle 21. The piston rods 160;161 of the aforesaid hydraulic cylinders 140;,41 are respectively connected to the connecting rods 23;22 by connectors 15;16. The hydraulic cylinders 140;141 each has an opposite end coupled with a respective steering knuckle 11 or 110 mounted on a respective locating axle 19 or 191 by respective clamps 12;13 or 121;131. When assembled, the locating rods 35;36 of the inner frame 32 are vertically stopped at the lamp holder 30 and the outer frame 31 at different elevations for allowing the car light L to be turned by the outer and inner frames 31;32 in one direction; the locating rods 33;34 of the outer frame 31 are vertically stopped at the lamp holder 30 at different elevations for allowing the car light L to be turned by the inner frame 32 in the reversed direction.

Figure 5:
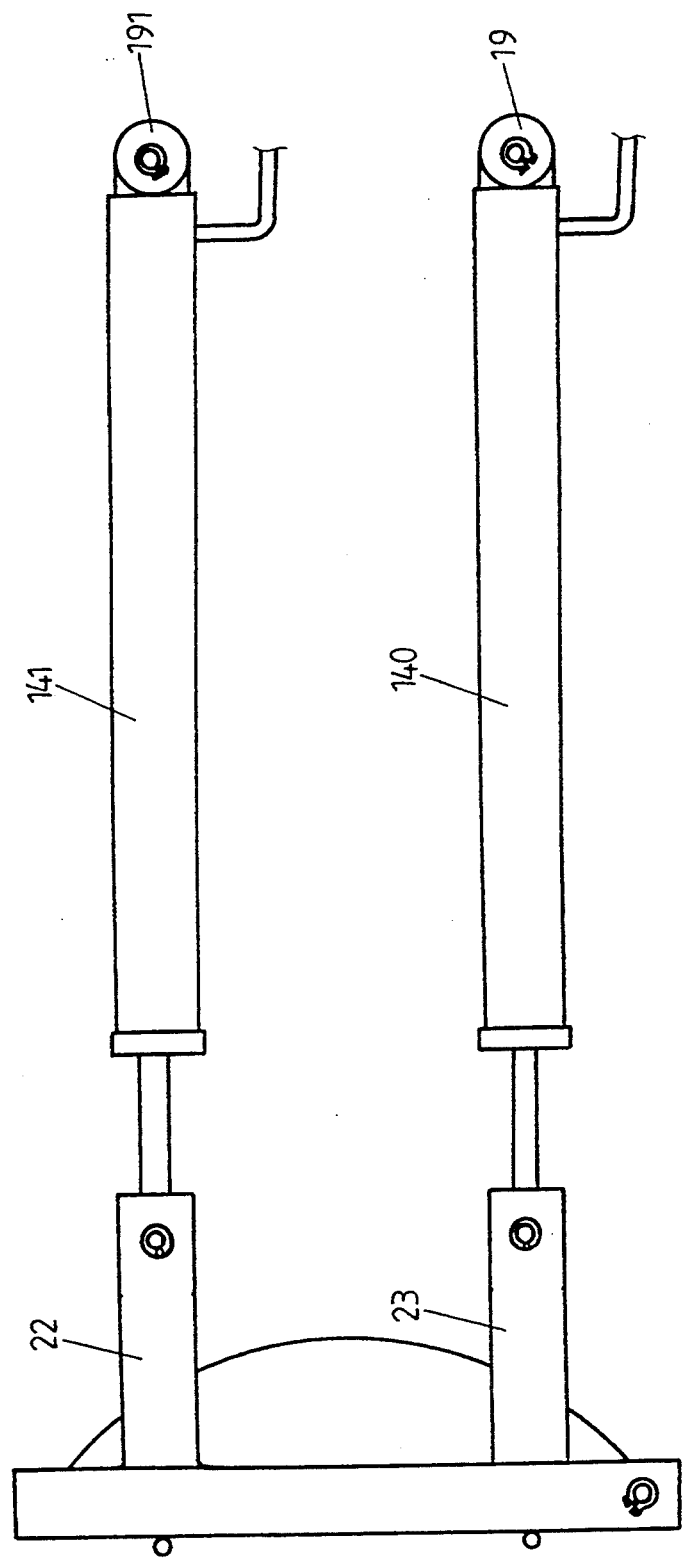
FIG. 5 is a stop view of FIG. 3.

Referring to FIG. 5, the hydraulic cylinders 140;141 are bilaterally disposed in parallel and connected between the connecting rods 22;23 and the locating axles 19;191 respectively. By means of the control of the control circuit 130, the hydraulic cylinders 140;141 are reciprocated by the aforesaid second servo motor 120 to pilot the car light L (details of the control operation will be described later).

Figure 6:
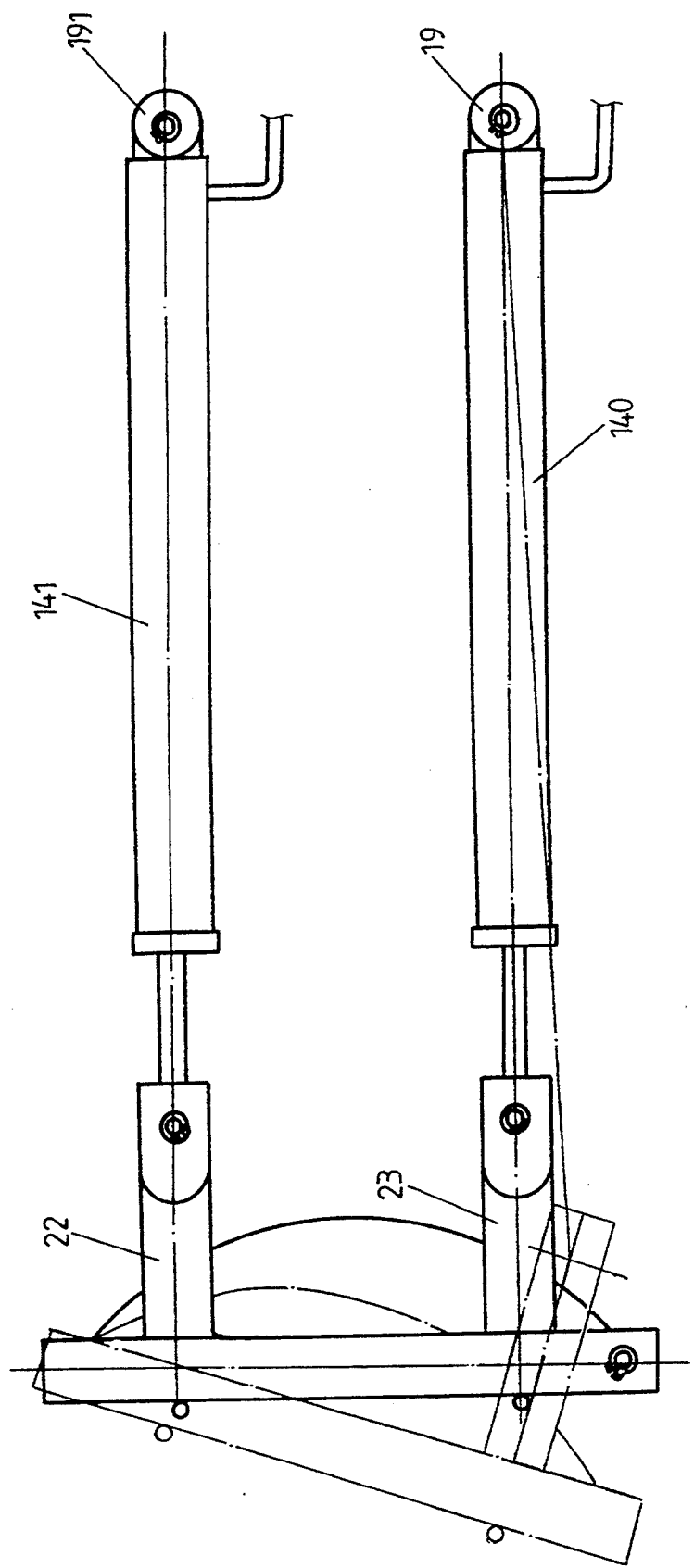
FIG. 6 is similar to FIG. 5 but showing the car light turned toward the right.

Referring to FIG. 6 and FIG. 2 again, as the second screw rod 1601 is rotated in one direction by the second servo motor 1201 to move the second control board 1701 downwards, hydraulic oil is moved from the hydraulic cylinders 1481;1491 toward the hydraulic cylinders 140;142 via the forward oil pipes 144;146 respectively to move the respective piston rods 160;162 outwards, and therefore the respective first connecting rods 23 are respectively moved outwards by the piston rods 160;162 to turn the respective inner frames 32 and the respective car lights L toward the right.

Figure 7:
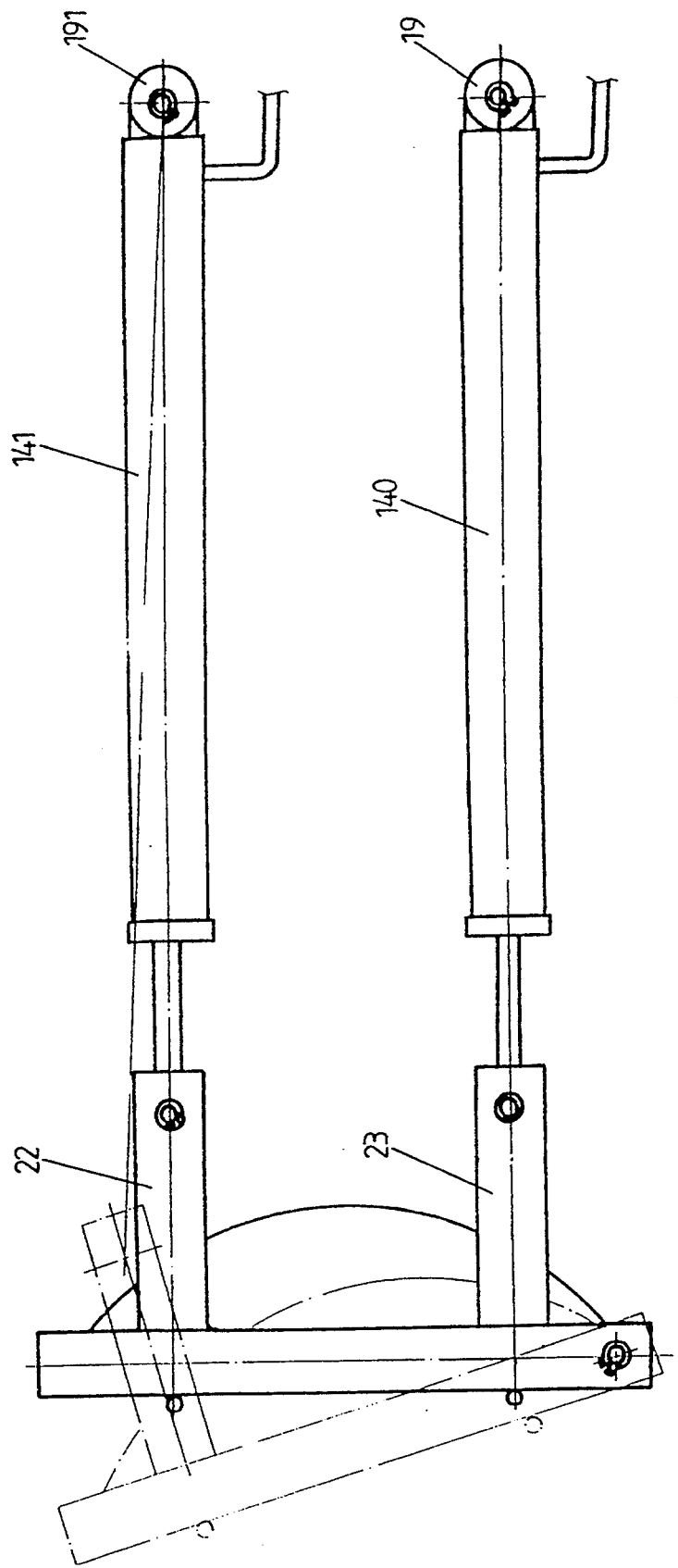
FIG. 7 is similar to FIG. 5 but showing the car light turned toward the left.
Figure 8:
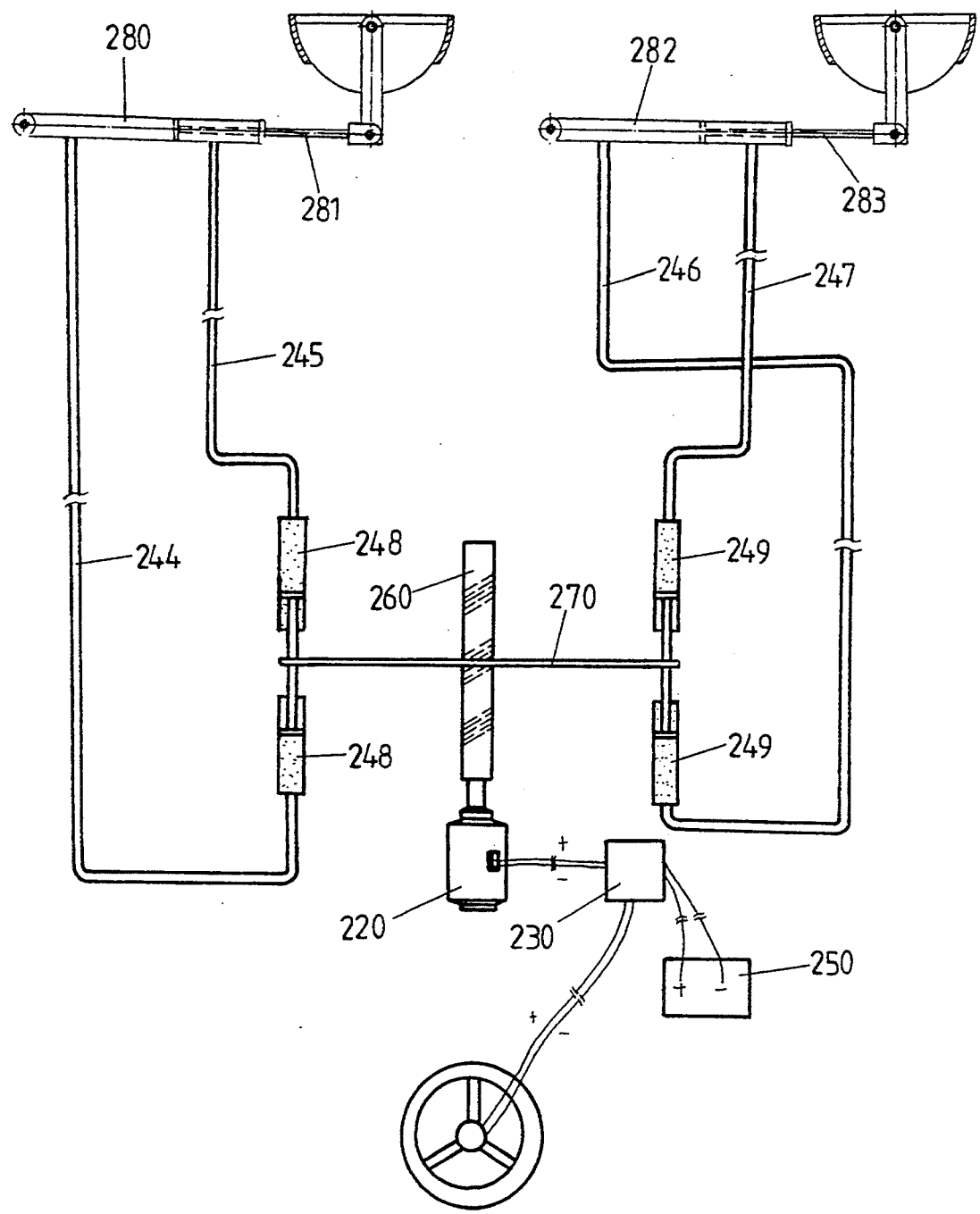
FIG. 8 illustrates the arrangement of a steering wheel controlled car light piloting system according to a second embodiment of the present invention.
Figure 9:
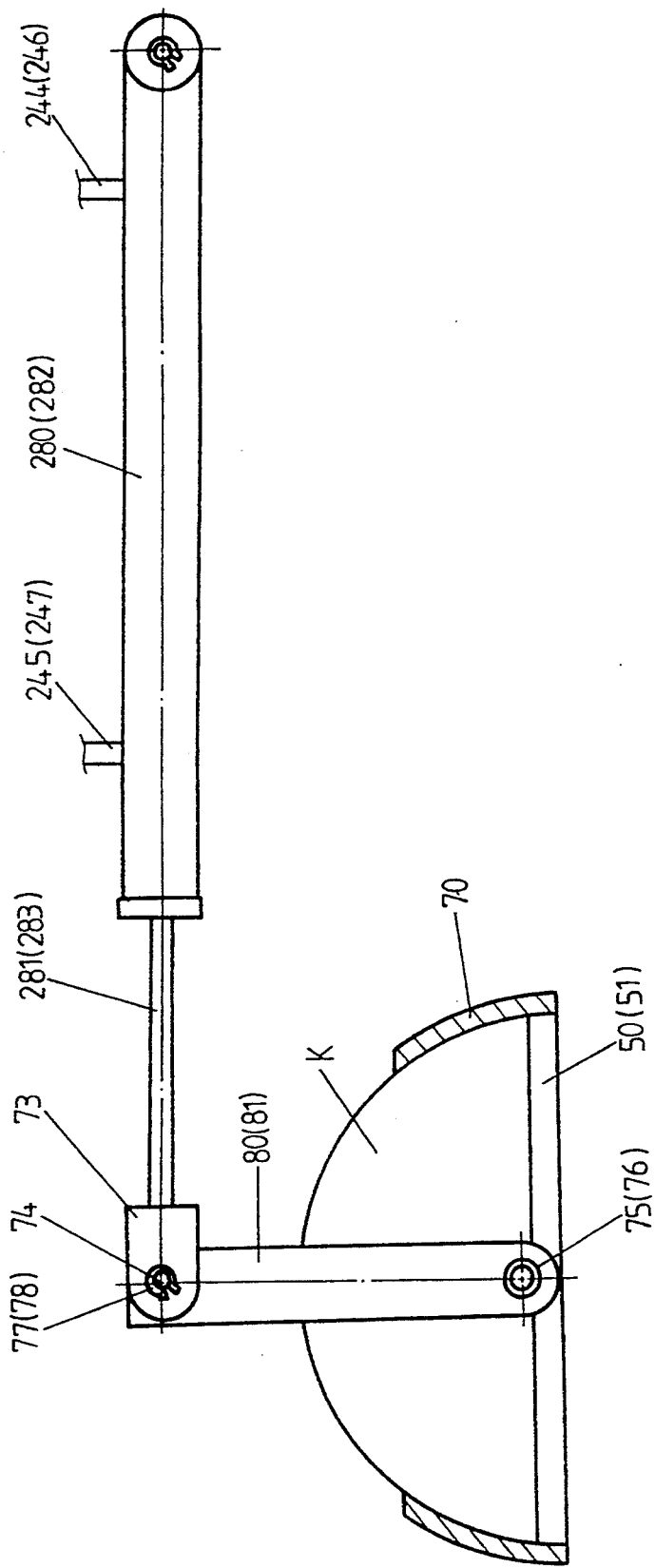
FIG. 9 is a partial enlarged view of the steering wheel,controlled car light piloting system of the second embodiment of the present invention, showing the linkage between the car light and the piston rod of the respective hydraulic cylinder.
Figure 10:
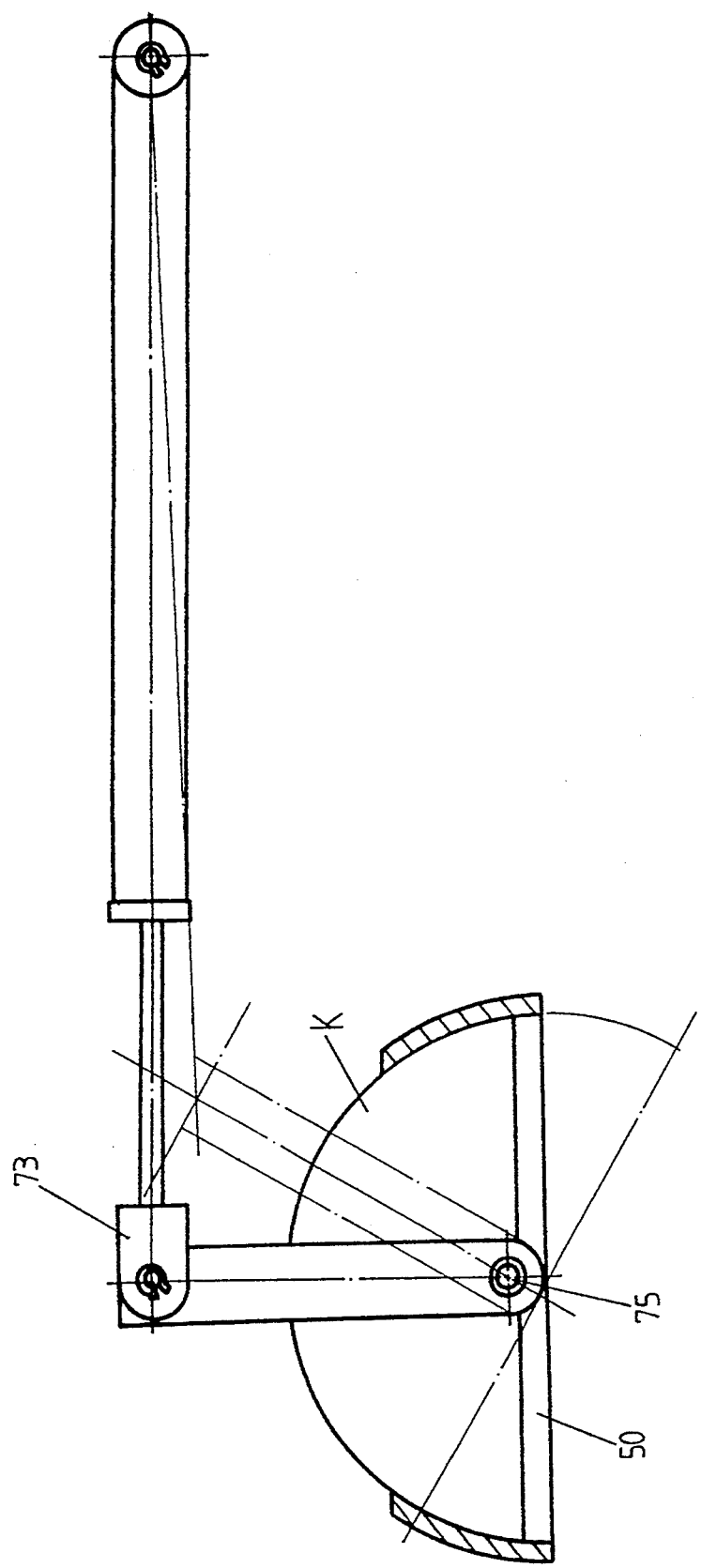
FIG. 10 is similar to FIG. 9 but showing the car light turned toward the right.
Figure 11:
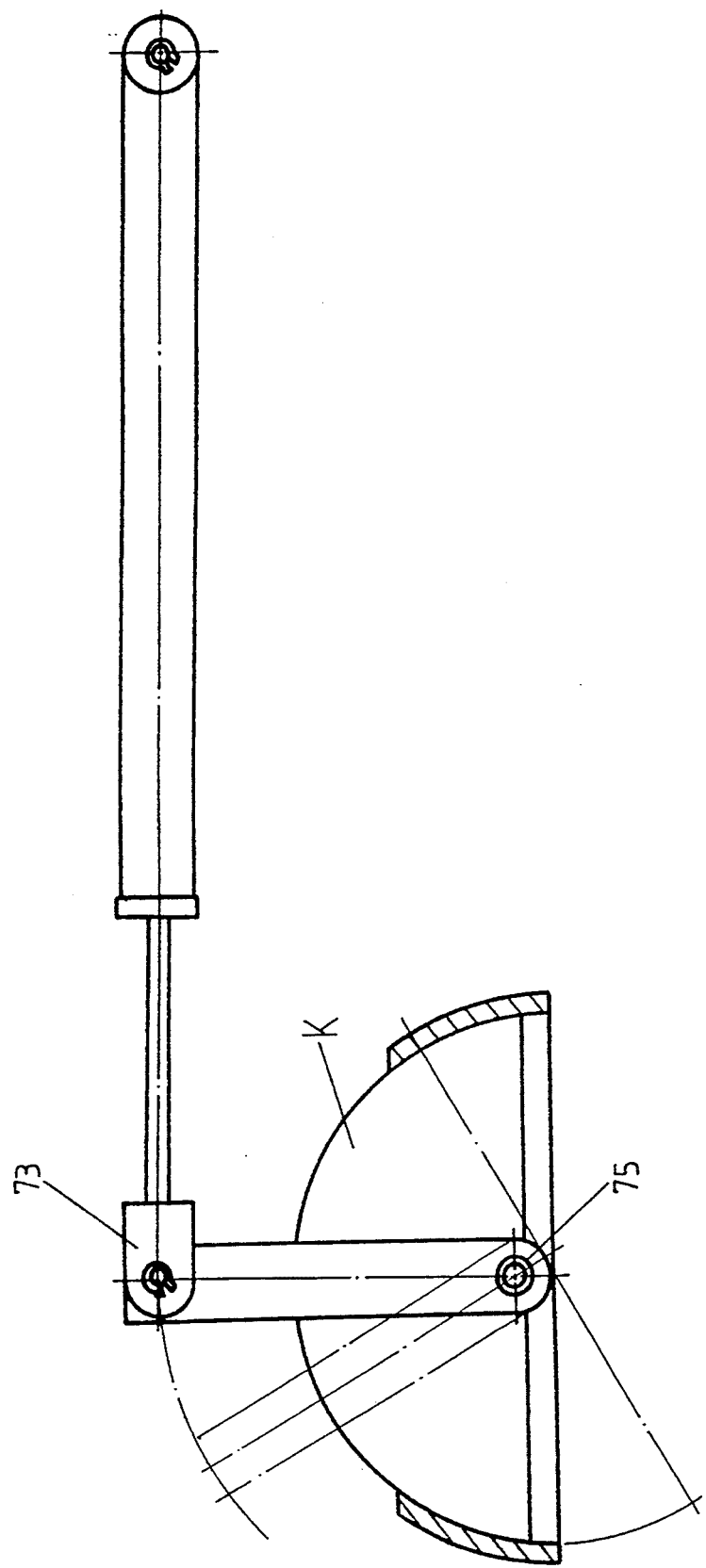
FIG. 11 is similar to FIG. 10 but showing the car light turned toward the left.

Referring to FIG. 7 and FIG. 2 again, as the first screw rod 1602 is rotated in one direction by the first servo motor 120 to move the first control board 170 upwards, hydraulic oil is moved from the hydraulic cylinders 148;149 toward the hydraulic cylinders 141;143 via the forward oil pipes 145;147 respectively to move the respective piston rods 161;163 outwards, and therefore the respective second connecting rods 22 are respectively moved outwards by the piston rods 161;163 to turn the respective outer and inner frames 31;32 and the respective car lights L toward the left.

Referring to FIGS. 8, 9, 10 and 11, therein illustrated is an alternate form of the present invention. This alternate form comprises a control circuit 230 connected to the steering wheel and battery power supply unit 250 of a motor vehicle to control the revolving speed, steering direction and number of revolution of a servo motor 220. A screw rod 260 is coupled to the output terminal of the servo motor 220 and driven to move a control board 270 back and forth alternatively. A pair of first hydraulic cylinders 248 and a pair of second hydraulic cylinders 249 are bilaterally mounted on the control board 270 at two opposite sides. There is a third hydraulic cylinder 280 having two opposite ends connected to the pair of first hydraulic cylinders 248 by a forward oil pipe 244 and a return oil pipe 245 respectively. There is a fourth hydraulic cylinder 282 having two opposite ends connected to the pair of second hydraulic cylinders 249 by a forward oil pipe 246 and a return oil pipe 247 respectively. The third and fourth hydraulic cylinders 280;282 each has a rear end fastened to a respective locating axle (not shown) by a respective steering knuckle (not shown). The piston rod 281 or 283 of the third or fourth hydraulic cylinder 280 or 282 is coupled with a connector 73 connected to the casing. 50 or 51 of a respective car light K through a respective link 80 or 81. The link 80 or 81 has one end fixed to the respective connector 73 by a fastening element 77 or 78 and an opposite end fixed to the casing 50 or 51 of the respective car light K by a fastening element 75 or 76. The car light K is received in an open housing 70 and driven by the respective piston rod 281 to turn leftward or rightward. As the servo motor 220 is turned in one direction, hydraulic oil is moved in one direction to extend the piston rods 281;283, causing the links 80;81 to turn the car lights k toward the right. As the servo motor 220 is turned in the reversed direction, hydraulic oil is moved in the reversed direction to retrieve the piston rods 281;283, causing the links 80;81 to turn the car lights K toward the left.

Figure 12:
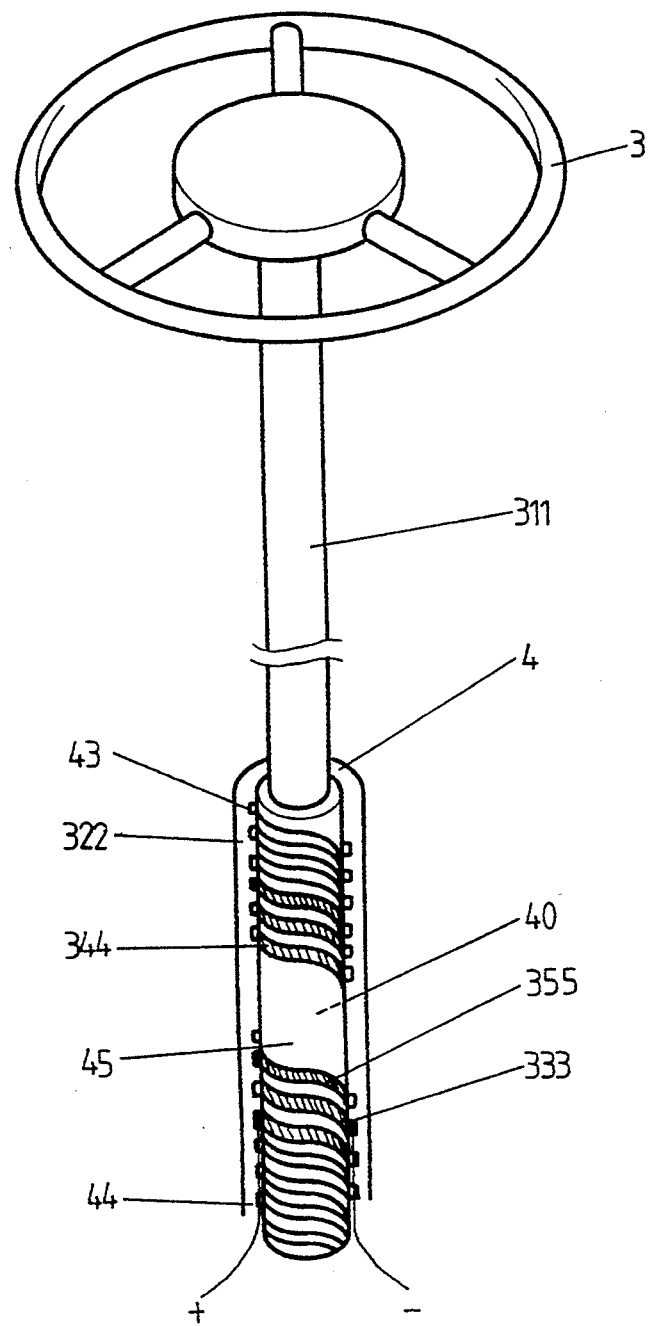
FIG. 12 is a partial broken away view of an electric contact mechanism according to the present invention.
Figure 13:
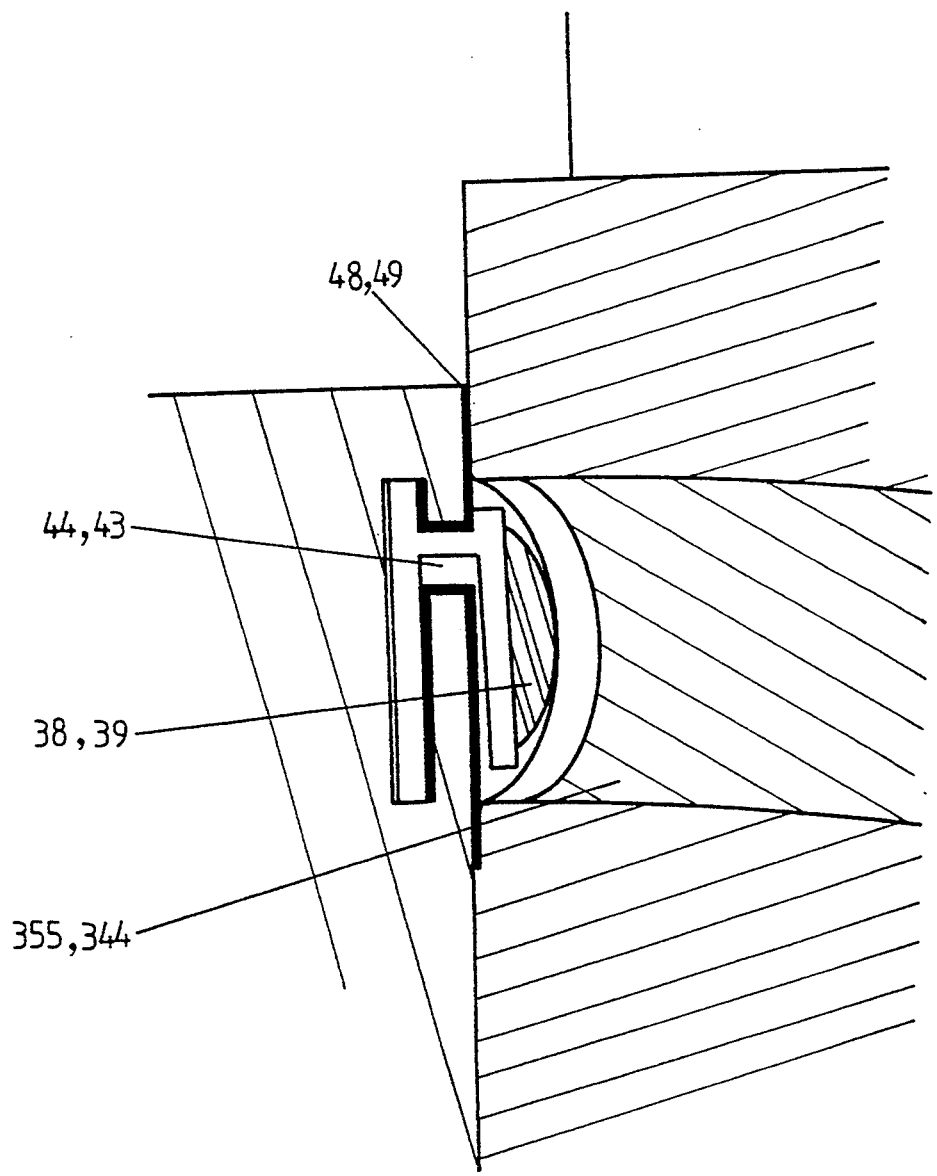
FIG. 13 is a partial enlarged view taken on part of FIG. 12 showing the contact between the electric brush and the respective metal contact.

Referring to FIGS. 12 and 13, the steering control of the car lights L or K is controlled by the steering wheel 3 of the motor vehicle through an electric contact mechanism. The electric contact mechanism comprises an inner sleeve 40 mounted around the steering column 311 of the steering wheel at a lower elevation, and an outer sleeve 4 mounted around the inner sleeve 40. The inner sleeve 40 comprises a left-handed thread 322 with a metal contact 344 on the outside wall thereof at the top, a right-handed thread 333 with a metal contact 355 on the outside wall thereof at the bottom, an electric wire 45 connected between the metal contacts 344;355. The outer sleeve 4 comprises a left-handed thread 43 with a metal contact 48 and an electric brush 38 on the inside wall thereof at the top, and a right-handed thread 44 with a metal contact 49 and an electric brush 39 on the inside wall thereof at the bottom.

Figure 14:
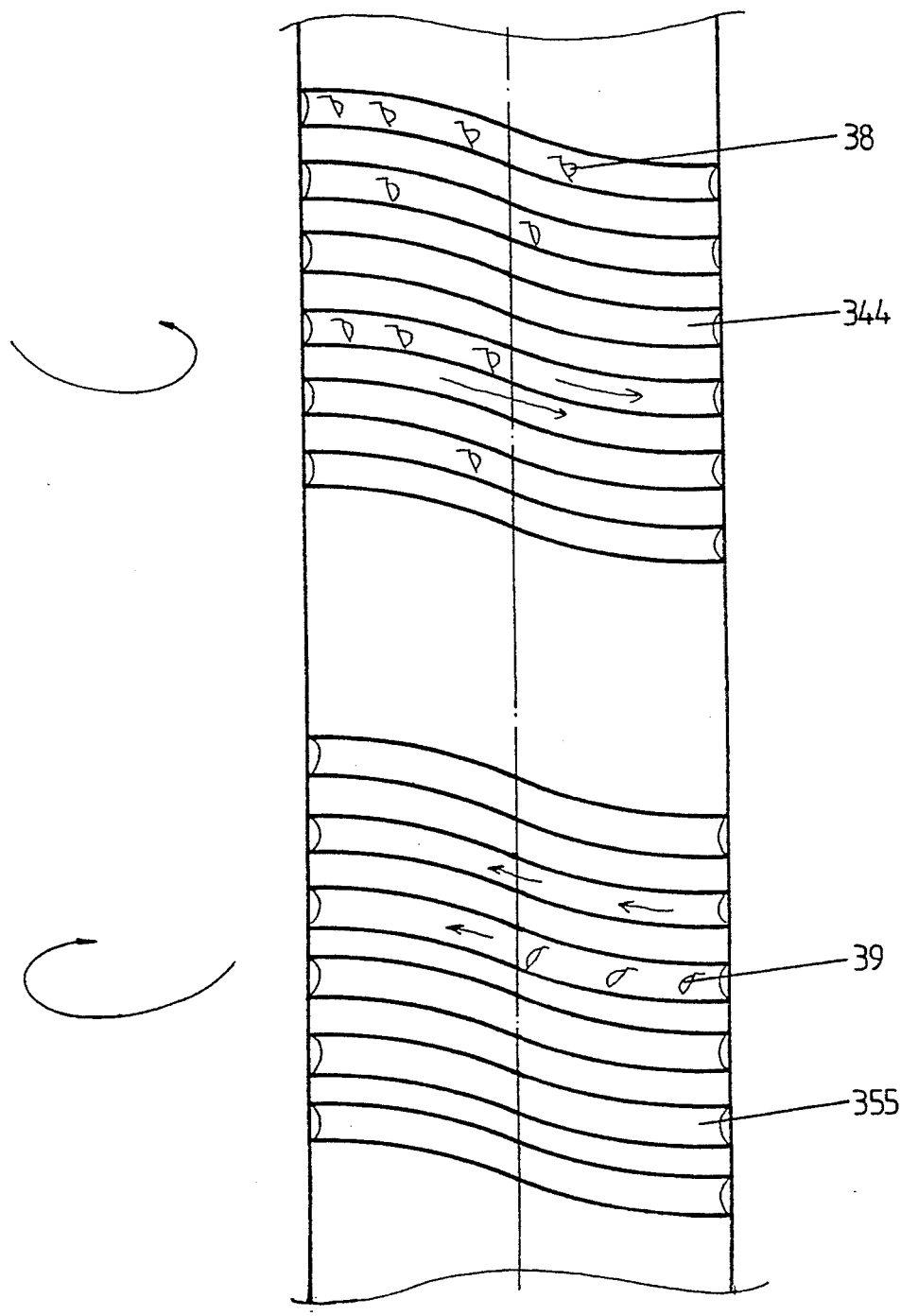
FIG. 14 illustrates the electric brushes moved in either direction to contact or disconnect from the respective metal contact.

Referring to FIG. 14, as the steering column 311 of the steering wheel 3 is turned toward the left, the upper electric brush 38 of the outer sleeve 4 is turned downward in the counter-clockwise direction to touch the metal contact 344 on the left-handed thread 322 of the inner sleeve 40, and at the same time, the lower electric brush 39 of the outer sleeve 4 is also turned downwards to separate from the metal contact 355 on the right-handed thread 333. On the contrary, as the steering column 311 of the steering wheel 3 is turned toward the right, the upper electric brush 38 of the outer sleeve 4 is turned upwards in the clock-wise direction to disconnect from the metal contact 344 on the left-handed thread 322 of the inner sleeve 40, and at the same time, the lower electric brush 39 of the outer sleeve 4 is also turned upwards to touch the metal contact 355 on the right-handed thread 33. The metal contacts 344;355 are respectively made in the form a variable resistor, therefore the turning angle of the car lights being controlled is directly proportional to the turning angle of the steering wheel 3. As the front and rear wheels of the car are aligned in straight, the electric brushes 38;39 are respectively electrically disconnected from the metal contacts 344;355. As the electric contact mechanism is connected to the car battery power supply unit through the aforesaid control circuit 130 or 230, the electric brushes 38;39 do no work as the ignition switch of the car is turned off.

Referring to FIG. 15, as the car is moving straight, the projection of light D of the car lights L is in line with the driver's sight E. As the car M is turning leftward or rightward, the car lights L will be turned to coincide the projection of light D with the direction of the driver's sight E so as to eliminate blind angle G.

As indicated, the present invention provides a steering wheel controlled car light piloting system which automatically pilots car lights to coincide with the steering direction of the car.

What is claimed is:

1. A steering wheel controlled car light piloting system comprising:

a plurality of lamp holder assemblies installed in a motor car to hold respective car lights for allowing said car lights to be respectively turned leftward or rightward;

two servo drive motors;

a transmission mechanism driven by said two servo drive motors to turn said car lights, causing said car lights to coincide with the steering direction of said motor car, said transmission mechanism comprising:

i) two screw rods, each screw rod connected to a respective servo drive motor so as to each rotatable in opposite directions about rotational axes;

ii) two control boards, each connected to a respective screw rod such that rotation of the screw rods causes linear movement of the control boards;

iii) two pairs of first hydraulic cylinders, each having an extendable and retractable piston rod with each pair connected to a respective lamp holder assembly such that movement of the piston rods cause turning of the lamp holder assembly;

iv) two pairs of second hydraulic cylinders, each having a movable piston with each pair connected to a control board such that linear movement of the control boards causes movement of the pistons:

v) conduit means hydraulically connecting each of the second hydraulic cylinders attached to one control board to one first hydraulic cylinder connected to said respective lamp holder assembly such that linear movement of each control board causes coinciding turning of the lamp holder assemblies with respect to one another;

a control circuit electrically connected to the two servo drive motors to control the revolving speed, revolving direction and number of revolutions of each of said two servo drive motors; and an electric contact mechanism controlled by the steering wheel of said motor car to actuate said control circuit causing it to control the revolving speed, revolving direction and number of revolutions of each of said two servo drive motors, said electric contact mechanism comprising electric brushes and variable resistance contacts respectively mounted around a steering column of the steering wheel of said motor car, whereby said electric brushes are electrically disconnected from said control circuit when the steering wheel is positioned so as to move said motor car straight and said electric brushes are electrically connected to said variable resistance contacts to trigger said control circuit as the steering wheel of said motor car is turned leftward or rightward, causing said control circuit to turn each of said two servo drive motors so that said car lights are turned to coincide with the steering direction of said motor car.

2. The steering wheel controlled car light piloting system according to claim 1 wherein the conduit means comprises a pressure conduit and a return conduit extending between each of said first hydraulic cylinders and its associated second hydraulic cylinder.

* * * * *